(12) United States Patent
Ohya et al.

(10) Patent No.: US 8,824,291 B2
(45) Date of Patent: Sep. 2, 2014

(54) PACKET DISTRIBUTION APPARATUS AND PACKET DISTRIBUTION METHOD

(75) Inventors: Yasuo Ohya, Tokyo (JP); Yasumichi Hashi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 168 days.

(21) Appl. No.: 13/352,630

(22) Filed: Jan. 18, 2012

(65) Prior Publication Data

US 2012/0257620 A1 Oct. 11, 2012

(30) Foreign Application Priority Data

Apr. 11, 2011 (JP) ................................ 2011-087749
Jan. 5, 2012 (JP) ................................ 2012-000452

(51) Int. Cl.
*H04L 12/54* (2013.01)
*H04L 12/56* (2006.01)
*H04L 29/06* (2006.01)

(52) U.S. Cl.
CPC ............... *H04L 12/54* (2013.01); *H04L 47/50* (2013.01); *H04L 49/90* (2013.01); *H04L 65/60* (2013.01); *H04L 69/168* (2013.01)
USPC ........... 370/232; 370/394; 370/412; 370/429; 370/468; 709/232

(58) Field of Classification Search
None
See application file for complete search history.

(56) References Cited

U.S. PATENT DOCUMENTS

| | | | |
|---|---|---|---|
| 5,751,958 A * | 5/1998 | Zweben et al. ............... | 709/204 |
| 5,758,089 A * | 5/1998 | Gentry et al. ................. | 709/234 |
| 6,870,861 B1 | 3/2005 | Negishi et al. | |
| 7,061,918 B2 * | 6/2006 | Duckering et al. ......... | 370/395.4 |
| 7,292,578 B1 * | 11/2007 | Kerr et al. ................. | 370/395.32 |
| 7,583,596 B1 * | 9/2009 | Frink .......................... | 370/230.1 |
| 8,526,452 B1 * | 9/2013 | Agarwal ...................... | 370/412 |
| 2002/0163933 A1 * | 11/2002 | Benveniste ................... | 370/465 |
| 2005/0100022 A1 * | 5/2005 | Ramprashad ............. | 370/395.42 |
| 2005/0152373 A1 * | 7/2005 | Ali ............................. | 370/395.4 |
| 2005/0240656 A1 * | 10/2005 | Blair .......................... | 709/213 |

(Continued)

FOREIGN PATENT DOCUMENTS

| | | |
|---|---|---|
| JP | 11-215083 A | 8/1999 |
| JP | 2000-032042 A | 1/2000 |

(Continued)

OTHER PUBLICATIONS

First Office Action mailed by Japan Patent Office on May 7, 2013 in the corresponding Japanese patent application No. 2012-000452.

(Continued)

*Primary Examiner* — Timothy J Weidner
(74) *Attorney, Agent, or Firm* — Knobbe, Martens, Olson & Bear LLP

(57) ABSTRACT

According to one embodiment, a packet distribution apparatus distributes packets each containing a digital content via a communication network. The packet distribution apparatus includes a generator, a packet transmitter, a detector and a swapper. The generator generates the packets for each session with a bit rate corresponding to a content to be distributed. The packet transmitter transmits the generated packets to the communication network. The detector detects a collision of transmission timings of the packets in the sessions. The swapper exchanges, upon detecting a collision of the transmission timings, a transmission order of packets associated with the collision of the transmission timings based on the bit rates.

10 Claims, 5 Drawing Sheets

(56) References Cited

U.S. PATENT DOCUMENTS

| | | | |
|---|---|---|---|
| 2008/0101231 A1* | 5/2008 | Lai et al. | 370/235 |
| 2009/0219815 A1* | 9/2009 | Insler et al. | 370/235 |
| 2012/0257620 A1* | 10/2012 | Ohya et al. | 370/389 |
| 2012/0323568 A1* | 12/2012 | Bruhn | 704/201 |

FOREIGN PATENT DOCUMENTS

| | | |
|---|---|---|
| JP | 2006-004279 | 1/2006 |
| JP | 2006-174282 A | 6/2006 |
| JP | 2008-147759 A | 6/2008 |

OTHER PUBLICATIONS

First Office Action issued by Japan Patent Office on Oct. 1, 2013 in the corresponding Japanese Patent Application 2012-000452—4 pages.

Decision of Rejection mailed by Japan Patent Office on Apr. 1, 2014 in the corresponding Japanese patent application No. 2012-000452—4 pages.

* cited by examiner

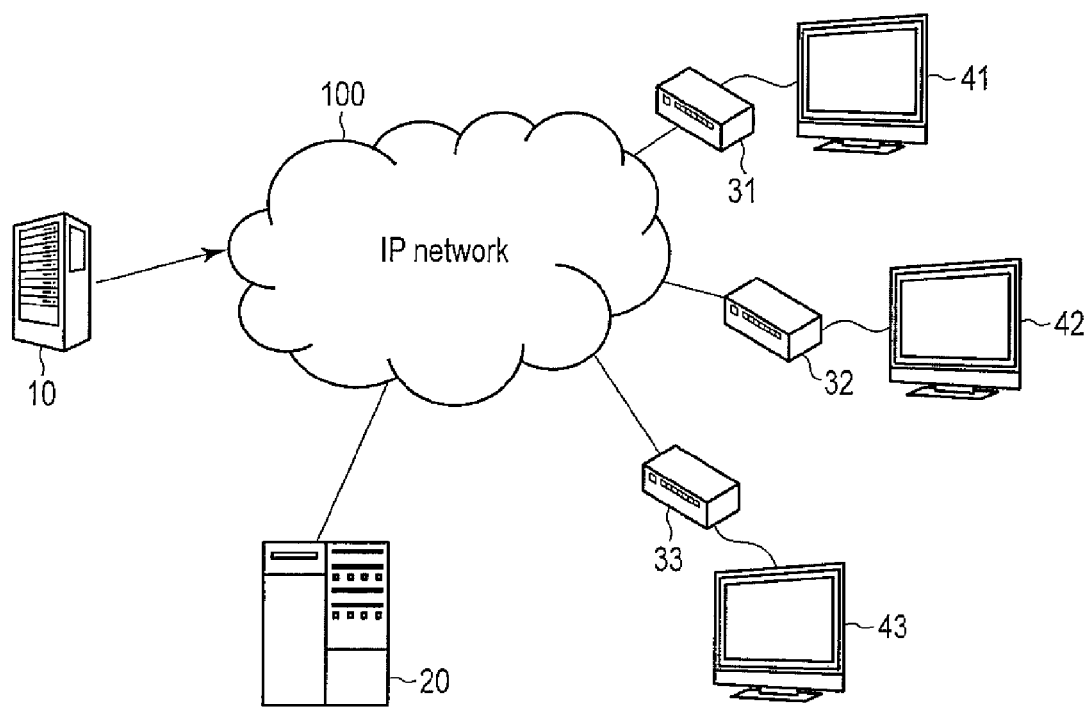
F I G. 1

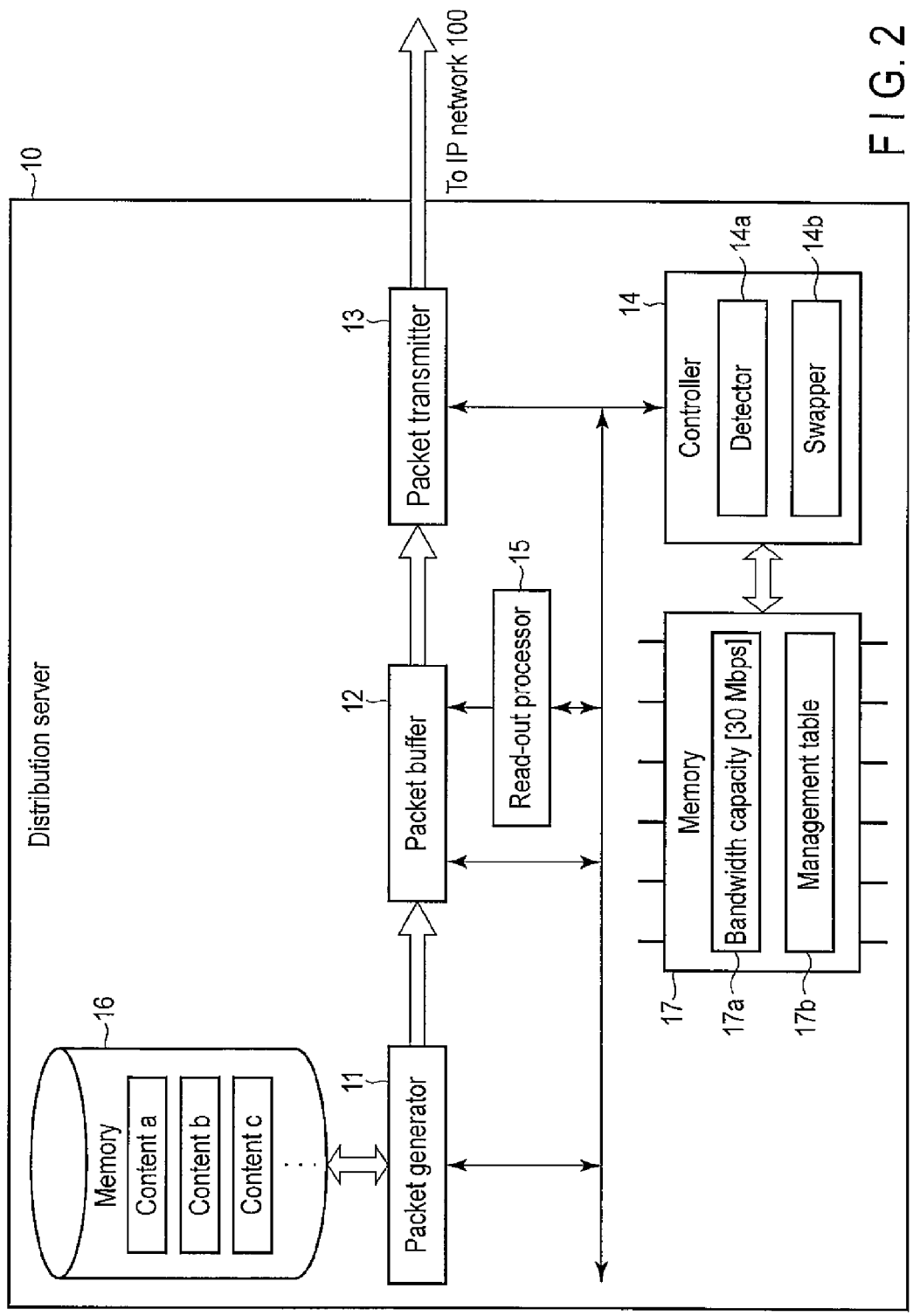
F I G. 2

| Session ID | Bit rate [Mbps] |
|---|---|
| AAA | 3 |
| BBB | 3 |
| CCC | 3 |
| DDD | 6 |
| EEE | 1.5 |
| FFF | 1.5 |
| GGG | 1.5 |
| HHH | 6 |
| III | 3 |
| ⋮ | ⋮ |

F I G. 3

PACKET DISTRIBUTION APPARATUS AND
PACKET DISTRIBUTION METHOD

CROSS-REFERENCE TO RELATED
APPLICATIONS

This application is based upon and claims the benefit of priority from prior Japanese Patent Applications No. 2011-087749, filed Apr. 11, 2011; and No. 2012-000452, filed Jan. 5, 2012, the entire contents of all of which are incorporated herein by reference.

FIELD

Embodiments described herein relate generally to a packet distribution apparatus and packet distribution method which use Internet Protocol (IP) network.

BACKGROUND

In recent years, IP broadcasting systems which, for example, form video contents into IP packets and distribute (or stream) them to a large number of unspecified viewers have been established. This type of systems uses IP network to distribute digital contents by terrestrial digital broadcasting or satellite digital broadcasting. Digital contents may be provided by a content provider.

New mobile broadband channels such as long term evolution (LTE) or worldwide interoperability for microwave access (WiMAX) have also been established. Along with development of the communication technology, an environment for providing services of a new style is in place.

Furthermore, systems in which users share video contents via video sharing sites have been established. This type of systems enables to open, in the Internet, video contents uploaded to a server by submitters.

In this technical field, it is important to stabilize, for each session, the sending rate of Transport Stream (TS) signals containing video data with high precision.

A Video on Demand (VOD) server distributes contents in response to a request from a viewer but the bit rate for each content is not always the same. To smoothly play back the contents on the reception side, it is necessary to distribute packets while keeping a stable sending rate for each session, as described above. If the total value of the sending rates in respectively sessions is small enough with respect to the bandwidth capacity (network bandwidth) of an interface involved in distribution of the packets, it is easy to stabilize the sending rate.

If, however, the total value of the sending rates comes close to the bandwidth capacity due to an increase in number of simultaneously formed sessions, the transmission timings for packets of the contents collide. Since a conventional technique transmits packets in the generation order, that is, in a first-come first-served manner, a packet which is postponed transmitting is delayed. Consequently, an interval at which packets reach the reception side becomes unstable, which results in deterioration of the quality of contents playback. Therefore, some measures for this problem are needed.

BRIEF DESCRIPTION OF THE DRAWINGS

FIG. 1 is a system diagram showing an example of a packet distribution system according to an embodiment;
FIG. 2 is a function block diagram showing an example of a distribution server 10 shown in FIG. 1;
FIG. 3 is a table showing an example of contents managed in a management table 17b shown in FIG. 2.

DETAILED DESCRIPTION

Figure 4:
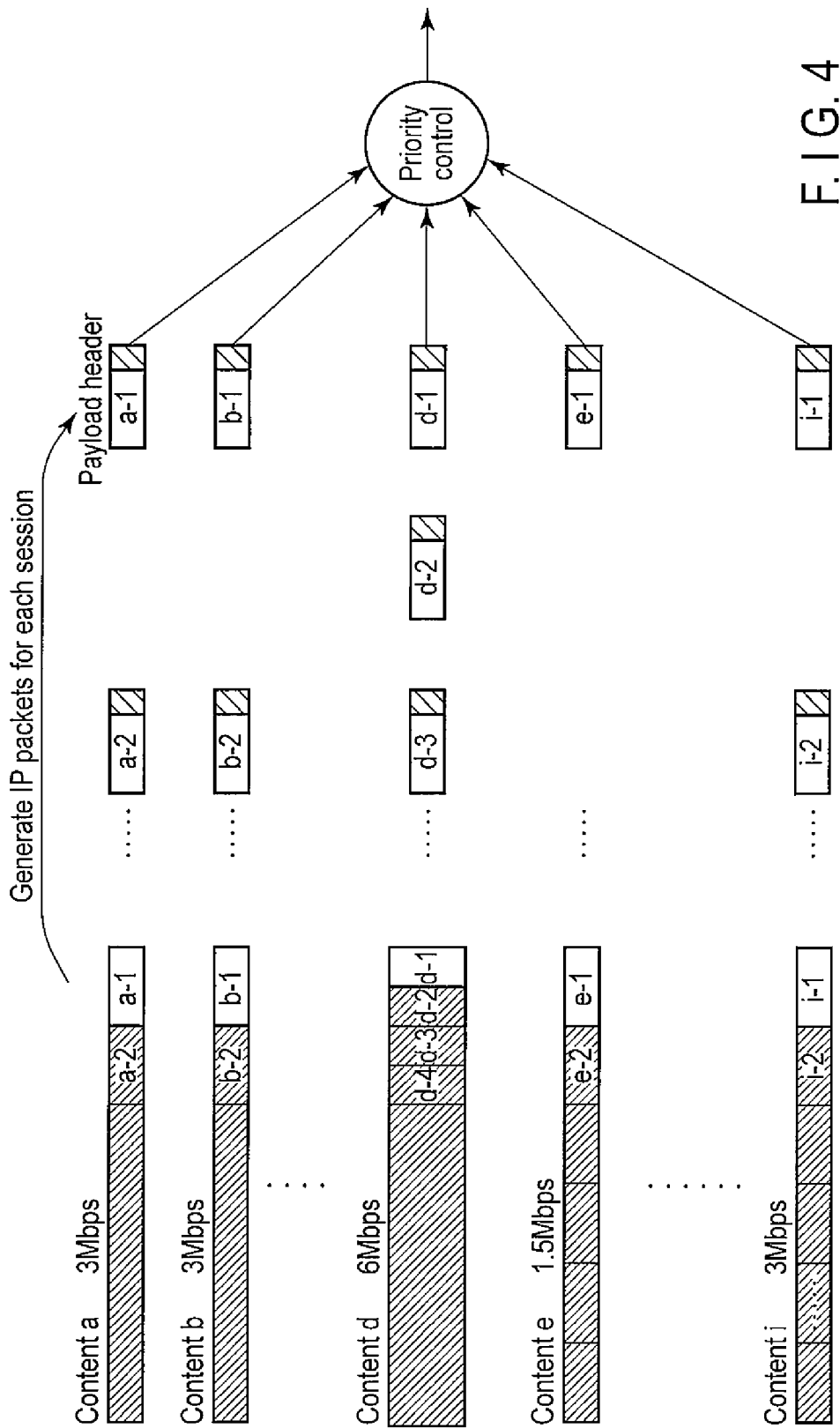
FIG. 4 is a view for explaining an operation in the embodiment.

In general, according to one embodiment, a packet distribution apparatus distributes packets each containing a digital content via a communication network. The packet distribution apparatus includes a generator, a packet transmitter, a detector and a swapper. The generator generates the packets for each session with a bit rate corresponding to a content to be distributed. The packet transmitter transmits the generated packets to the communication network. The detector detects a collision of transmission timings of the packets in the sessions. The swapper exchanges (or swaps), upon detecting a collision of the transmission timings, a transmission order of packets associated with the collision of the transmission timings based on the bit rates.

FIG. 1 is a system diagram showing an example of a packet distribution system according to an embodiment. The system shown in FIG. 1 includes a distribution server 10 connected with an IP network 100, and viewing terminals 41 to 43. The viewing terminals 41 to 43 are connected with the IP network 100 via set-top boxes (STBs) 31 to 33 each serving as an interface function, respectively.

The distribution server 10 transmits transport stream over IP packets containing digital contents to the IP network 100 in response to, for example, a request from the viewer. The IP packets are streamed according to, for example, Real-time Transport Protocol (RTP) via the IP network 100. The streamed IP packets are received by, for example, the set-top boxes (STBs) 31 to 33. The STBs 31 to 33 restore moving images, audio, and the like from the received IP packet, and play them back in the viewing terminals 41 to 43, respectively.

FIG. 2 is a functional block diagram showing an example of the distribution server 10 shown in FIG. 1. The distribution server 10 includes a packet generator 11, a packet buffer 12, a packet transmitter 13, a controller 14, a readout controller 15, a storage device 16, and a memory 17. The packet generator 11 reads out a content (content a, content b, content c, ... ) from the storage device 16 to generate IP packets.

That is, the packet generator 11 generates IP packets for each session with a bit rate according to a content to be streamed. That is, the bit rate is associated with each content, and therefore, the timing at which each IP packet is generated is different for each content.

The generated IP packets are written in the packet buffer 12. The readout controller 15 executes readout processing for the packet buffer 12. The IP packets are read out at readout timing for each session, and sent to the packet transmitter 13. The packet transmitter 13 transmits the IP packets to the IP network 100.

To stably control the rate (sending rate) at which the IP packets are transmitted to the IP network 100, the controller 14 controls the readout timing of the readout controller 15. This makes it possible to stabilize or maintain the sending rate of the IP packets.

The memory 17 includes a bandwidth capacity 17a and management table 17b as data related in the embodiment. The bandwidth capacity 17a indicates the bandwidth capacity of an interface related to the streaming distribution. The bandwidth capacity indicates the bandwidth capacity of the IP network 100 itself or the bandwidth capacity of an interface between the distribution server 10 and the IP network 100. That is, the bandwidth capacity can be considered as the capacity of a communication channel which can include a plurality of sessions according to the embodiment.

FIG. 3 is a table showing an example of contents managed in the management table 17b shown in FIG. 2. In the management table 17b, a bit rate for each session of streaming distribution is recorded in association with the session. For example, the bit rate of a session indicated by a session ID (IDentification)=AAA is 3 Mega bit per second (Mbps).

The controller 14 includes a detector 14a and a swapper 14b as processing functions according to the embodiment. The detector 14a detects collisions of transmission timings for the IP packets transmitted from the packet transmitter 13. The collisions occur between sessions. The detector 14a may predict the occurrence of collisions based on the statistical history of the IP packet transmission timings.

For example, it is expected that the IP packet transmission timings converge in a cycle corresponding to the least common multiple of the packet transmission intervals for respective sessions. By recording an IP packet transmission timing for each session, the detector 14a can predict a timing when the packet transmission timings for respective sessions converge. That is, it is possible to predict a collision of transmission timings based on the statistical history of the IP packet transmission timings. This type of processing is called lookahead. That is, the detector 14a predicts the occurrence of collisions based on the statistical history of the IP packet transmission timings.

When a collision of transmission timings is detected, the swapper 14b exchanges the transmission order of the IP packets associated with the collision based on the bit rates of the sessions. The swapper 14b may exchange the transmission order of the IP packets with reference to the management table 17b of the memory 17.

The swapper 14b may exchange the transmission order of the IP packets in a certain range. That is, in an environment in which there are a plurality of sessions, the transmission interval may be different for each session but the IP packets are controlled to be transmitted to be kept in a certain range of the quality of the packet jitter in each session.

The swapper 14b may prioritize an IP packet in a session with a higher bit rate over an IP packet in a session with a lower bit rate. The swapper 14b may exchange the transmission order of the IP packets with reference to the management table 17b and the bandwidth capacity 17a. An operation in the above-described configuration will be described.

FIG. 4 is a view for explaining an operation in the embodiment. Referring to FIG. 4, IP packets are generated for each session corresponding to the content a, b, d, e, . . . , or requested to be distributed. If a content is a video content, it has a different bit rate depending on its amount of information or resolution.

For example, the content a is divided into a plurality of data a-1, a-2, . . . . Each data a-1, a-2, . . . is inserted into the payload of an IP packet having a header. If the total value of the bit rates of the contents comes close to the bandwidth capacity, transmission timings of IP packets collide. That is, transmission timings temporally collide for the IP packets generated for respective sessions. If a collision occurs, the controller 14 executes priority control.

Figure 5:
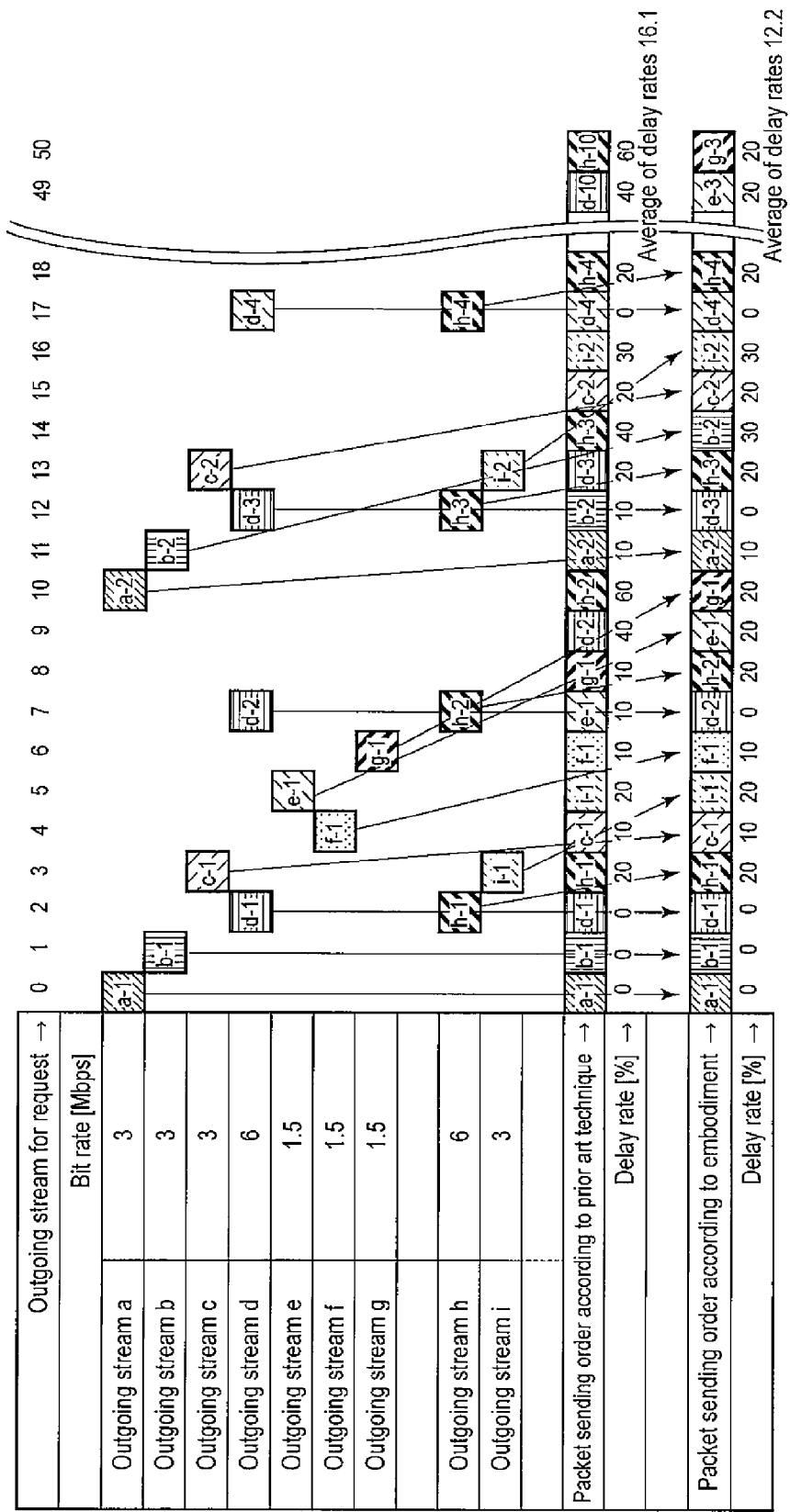
FIG. 5 is a view showing effects obtained in the embodiment as compared with a conventional technique.

FIG. 5 is a view showing effects obtained in the embodiment as compared with a conventional technique. FIG. 5 shows a case in which IP packet transmission timings may collide between sessions (streams). This state corresponds to a state in which the total value of sending rates comes close to the bandwidth capacity because a number of sessions are simultaneously formed. If the number of sessions is small, packets rarely collide. As the number of sessions becomes larger, packets collide at a higher probability. That is, IP packets are transmitted in a burst to the IP network 100 at a higher probability.

A portion indicated by a number 7 in a transmitting stream column for a request in FIG. 5 is referred to. Under control of the conventional technique, a packet e-1 is sent at this time, followed by packets g-1, d-2, h-2, . . . . This is because, when the transmission timings of IP packets collide, priority control is generally executed according to FIFO (First In, First Out). A delay rate as an index indicating a delay [%] in an actual sending timing with respect to a packet interval is obtained by $$\gamma = \beta/\alpha \qquad (1)$$

where γ represents the delay rate, α represents the packet sending interval time obtained based on the bit rate for each stream, and β represents the difference between an actual sending timing and a timing when a packet should be sent. The delay rate can be obtained based on the bit rate for each stream.

The delay rates of the packets d-2 and h-2 sent under control of the conventional technique in the example shown in FIG. 5 are 40% and 60%, respectively. That is, an adverse effect due to a shift of the transmission timing of a packet becomes large as a content has a higher bit rate.

To the contrary, in this embodiment, a packet d-2 is sent at this time, followed by packets h-2, e-1, g-1, . . . . Note that the delay rate is up to 30%, and never becomes 40% or more.

In the conventional technique, the average of the delay rates is 16.1%. To the contrary, in this embodiment, the average is only 12.2%. As described above, according to the embodiment, it is possible to decrease the delay rate. This means that the transmission timings of IP packets for each bit rate are leveled out.

As described above, in the embodiment, priority according to the bit rate of each content is given to IP packets generated for a corresponding session. The delay of a content having a higher bit rate with respect to an ideal transmission timing has a larger influence on an IP packet transmission interval. The delay of the IP packet transmission timing of a content having a lower bit rate has a smaller influence on an IP packet transmission interval. That is, the delay of an IP packet of a content having a lower bit rate has a smaller influence on the transmission quality than that of the delay of an IP packet of a content having a higher bit rate.

In consideration of this, in this embodiment, lower priority is assigned to an IP packet having a lower bit rate and higher priority is assigned to an IP packet having a higher bit rate. It is possible to bring the IP packet transmission interval for each session close to the interval based on the session's bit rate. It is, therefore, possible to level out transmission delay rates with respect to the IP packet transmission interval, thereby optimizing the IP packet transmission timings as a whole.

With this operation, it is possible to stabilize the sending rate across a plurality of sessions. This enables to stably stream IP packets. Therefore, it is possible to provide a packet distribution apparatus and packet distribution method for optimizing the packet transmission order to increase the efficiency of streaming.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A packet distribution apparatus configured to distribute packets comprising a digital content via a communication network, comprising:
   a generator configured to generate the packets for each of a plurality of sessions, each having a bit rate and corresponding to a content to be distributed;
   a packet transmitter configured to transmit the packets to the communication network;
   a detector configured to detect a collision of transmission timings of the packets in at least two of the plurality of sessions; and
   a swapper configured to exchange, upon detecting the collision of the transmission timings, a transmission order of the packets in the at least two of the plurality of sessions based on the bit rate of each of the at least two of the plurality of sessions, further comprising
   a memory configured to store a table configured to record the bit rate for each of the plurality of sessions,
   wherein the swapper exchanges the transmission order with reference to the table.

2. The apparatus according to claim 1, wherein the swapper exchanges the transmission order to stabilize a packet transmission interval corresponding to the bit rate for each of the at least two of the plurality of sessions.

3. The apparatus according to claim 1, wherein the swapper prioritizes a first packet in one of the plurality of sessions with a higher bit rate over a second packet in another one of the plurality of sessions with a lower bit rate.

4. The apparatus according to claim 1, wherein
   the memory is configured to store a bandwidth capacity of an interface involved in distribution of the packets, and
   the swapper exchanges the transmission order with reference to the table stored in the memory and the bandwidth capacity.

5. The apparatus according to claim 1, wherein the detector predicts an occurrence of the collision of the transmission timings based on a statistical history of the transmission timings.

6. A packet distribution method for a distribution apparatus configured to distribute packets each comprising a digital content via a communication network, comprising:
   generating the packets for each of a plurality of sessions, each having a bit rate and corresponding to a content to be distributed;
   transmitting the packets to the communication network;
   detecting a collision of transmission timings of the packets in at least two of the plurality of sessions; and
   changing, upon detecting the collision of the transmission timings, a transmission order of the packets in the at least two of the plurality of sessions based on the bit rate of each of the at least two of the plurality of sessions,
wherein at least one of the steps is carried out by the distribution apparatus, further comprising
   storing a table recording the bit rate for each of the plurality of sessions, and
   changing the transmission order with reference to the table.

7. The method according to claim 6, wherein exchanging the transmission order stabilizes a packet transmission interval corresponding to the bit rate for each of the at least two of the plurality of sessions.

8. The method according to claim 6, wherein a first packet in one of the plurality of sessions with a higher bit rate is prioritized over a second packet in another one of the plurality of sessions with a lower bit rate.

9. The method according to claim 6, further comprising
   storing a bandwidth capacity of an interface involved in distribution of the packets, and
   exchanging the transmission order with reference to the table and the bandwidth capacity.

10. The method according to claim 6, further comprising
    predicting occurrence of the collision of the transmission timings based on a statistical history of the packet transmission timings.

* * * * *